(12) United States Patent
Sagae et al.

(10) Patent No.: US 8,577,281 B2
(45) Date of Patent: Nov. 5, 2013

(54) DISTRIBUTION SYSTEM, DISTRIBUTION APPARATUS, TERMINAL APPARATUS, AND METHOD WHICH DISTRIBUTE A COMMON CONTROL SIGNAL

(75) Inventors: Yuta Sagae, Kawasaki (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 254 days.

(21) Appl. No.: 13/060,187

(22) PCT Filed: Aug. 13, 2009

(86) PCT No.: PCT/JP2009/064312
§ 371 (c)(1),
(2), (4) Date: Jun. 14, 2011

(87) PCT Pub. No.: WO2010/024135
PCT Pub. Date: Mar. 4, 2010

(65) Prior Publication Data
US 2011/0250835 A1    Oct. 13, 2011

(30) Foreign Application Priority Data
Aug. 25, 2008 (JP) ................................. 2008-215929

(51) Int. Cl.
*H04H 20/71* (2008.01)
(52) U.S. Cl.
USPC ............ 455/3.01; 455/68; 455/515; 455/3.03
(58) Field of Classification Search
USPC ................. 455/3.01, 3.03, 414.3, 422.1, 447, 455/452.1, 434, 515, 68; 370/328, 252
See application file for complete search history.

(56) References Cited

U.S. PATENT DOCUMENTS

| | | | |
|---|---|---|---|
| 7,990,883 B2 * | 8/2011 | Nishikawa | 370/252 |
| 2007/0098009 A1 * | 5/2007 | Du et al. | 370/445 |
| 2010/0027466 A1 * | 2/2010 | Mustapha | 370/328 |
| 2010/0235491 A1 * | 9/2010 | Purdy et al. | 709/224 |

FOREIGN PATENT DOCUMENTS

| WO | WO 02/054818 A1 | 7/2002 |
|---|---|---|
| WO | WO 2008/044664 A1 | 4/2008 |

OTHER PUBLICATIONS

Perez-Romero, J. et al., "A Novel On-Demand Cognitive Pilot Channel Enabling Dynamic Spectrum Allocation", New Frontiers in Dynamic Spectrum Access Networks, pp. 46-54 (Apr. 2007) ISBN: 1-4244-0663-3.

Martigne, P. et al., "An Alternative Concept to Scanning Process for Cognitive Radio Systems: Technical and Regulatory Issues", 16th IST Mobile and Wireless Communication Summit, Total pp. 5 (Jul. 2007).

(Continued)

Primary Examiner — John J Lee
(74) Attorney, Agent, or Firm — Oblon, Spivak, McClelland, Maier & Neustadt, L.L.P.

(57) ABSTRACT

A distribution apparatus distributes a common control signal to one or more regions with one or more communications system which can be used. The common control signal includes system information required for accessing the communications system of each of the regions. The distribution apparatus has a unit which generates the common control signal of each of the regions, a unit which receives a distribution request signal from a terminal apparatus which requests for distribution of the common control signal, and a unit which transmits the common control signal according to a distribution rule. The distribution rule is updated according to a statistical trend of the distribution request signals received.

11 Claims, 7 Drawing Sheets

(56) References Cited

OTHER PUBLICATIONS

International Search Report Issued Nov. 17, 2009 in PCT/JP09/064312 filed Aug. 13, 2009.
Extended European Search Report issued Oct. 8, 2012 in Patent Application No. 09809788.4.

D. Bourse, et al., "The $E^2R$ II Flexible Spectrum Management (FSM) Framework and Cognitive Pilot Channel (CPC) Concept—Technical and Business Analysis and Recommendations", End to End Reconfigurability II ($E^2R$ II) White Paper, XP008145264, Nov. 1, 2007, pp. 1-52.

\* cited by examiner

| MESH NUMBER | TERMINAL INFORMATION |
|---|---|

DISTRIBUTION SYSTEM, DISTRIBUTION APPARATUS, TERMINAL APPARATUS, AND METHOD WHICH DISTRIBUTE A COMMON CONTROL SIGNAL

BACKGROUND OF THE INVENTION

1. Field of the Invention

The present invention generally relates to the technical field of radio communications, and particularly relates to distribution systems, distribution apparatuses, terminal apparatuses and methods which distribute a common control signal. The common control signal is a control signal which includes system information required for accessing a communications system in a region which can be used by one or more radio communications systems.

2. Description of the Related Art

In this type of technical field, studies of communications schemes using a cognitive pilot channel (CPC) are being pushed forward. For these schemes, a cognitive pilot channel is transmitted to each of multiple regions in which one or more communications systems are being operated. The cognitive pilot channel includes information on radio systems used within each region, radio schemes, frequencies, etc., thereof. The cognitive pilot channel is used, so that basic parameter information of a radio system which can be connected to by a terminal apparatus is relatively easy to obtain for the terminal apparatus. Moreover, the cognitive pilot channel may be used to flexibly deal with a change of some of parameters allocated to a radio system on a fixed basis (frequency, etc.) that was difficult in the past (because it suffices to change control information). The cognitive pilot channel also provides an advantage that it may be applied without changing the terminal apparatus itself. Therefore, a technique using a cognitive pilot channel can be adopted to flexibly respond to decreased price of a terminal apparatus, and a radio system parameter change. The radio system parameter change may be dealt with flexibly, so that improved utilization efficiency may also be expected.

In the present technique, an area covered by a distribution station (which may be shared for use with a base station apparatus) is divided into multiple zones. The divided zones may also be called a mesh. Within an area covered by the distribution station a common control signal or a cognitive pilot channel is distributed. A method of utilizing a radio resource such as basic parameter information, etc., of a radio system is reported multiple times for each mesh from the distribution station. Information reported is the same, and does not depend on the times.

Moreover, as a method of distributing a common control signal, there are two types, a notice-type distribution method and an on-demand type distribution method. In the notice-type distribution method, the distribution station periodically distributes control information for a mesh within a region of which the distribution station is in charge. In the on-demand type distribution method, the distribution station distributes control information for a mesh requested by the terminal apparatus in response to a request for distribution from the terminal apparatus. Moreover, a method is also proposed which combines the notice-type distribution method and the on-demand type distribution method and switches between the distribution methods according to information to be distributed. The on-demand type distribution method is disclosed in Non-patent document 1.

Non-patent document 1: J. Perez-Romero, et al., "A Novel On-Demand Cognitive Pilot Channel enabling Dynamic Spectrum Allocation," IEEE Dyspan 2007

SUMMARY OF THE INVENTION

Problem(s) to be Solved by the Invention

However, related-art distribution systems have the following problem. With the related-art distribution system, for what is divided into mesh units or individual meshes, system information of a corresponding radio system is distributed. At that time, importance for a terminal apparatus of the system information is not taken into account, so that a large number of system information sets of low importance may be wastefully transmitted, or system information of high importance may not be transmitted easily. Distributing information of low importance becomes a significant factor in decreasing frequency utilization efficiency. When an on-demand type distribution method is adopted as a distribution method, there is a concern with a problem that, in a region of a large number of terminal apparatuses, the number of request signals from terminal apparatuses increases and the times of distributing the common control signal increases (overhead increases) results in scarcity of frequency bandwidths, leading to an increased difficulty in securing bandwidths for communications.

An object of the present invention is to achieve an improvement in distribution efficiency of a common control signal in a distribution system which distributes the common control signal to a region in which one or more radio communications systems can be used.

Means for Solving the Problem

A distribution apparatus for use in the present invention distributes a common control signal to a region in which one or more communications system can be used. The common control signal includes system information required for accessing a communications system of each region. The distribution apparatus has a unit which generates a common control signal of each region, a unit which receives a distribution request signal from a terminal apparatus which requests for distribution of the common control signal, and a unit which transmits the common control signal according to a distribution rule. The distribution rule is updated according to a statistical trend of a distribution request signal received.

Advantage of the Invention

According to the present invention, an improvement may be achieved in distribution efficiency of a common control signal in a distribution system which distributes the common control signal to a region in which one or more radio communications systems can be used.

DESCRIPTION OF THE PREFERRED
EMBODIMENTS

Best Mode of Carrying Out the Invention

According to one embodiment of the present invention, distribution efficiency of a common control signal may be enhanced according to information needed by the terminal apparatus (highly important information), overhead, distribution environment, etc. What system information is needed to what degree differs from mesh to mesh. Then, according to one embodiment of the present invention, when a distribution frequency is determined, the whole region covered by a distribution apparatus is taken into account, and both a mesh to distribute to and information to be distributed are taken into account to determine the distribution rule.

The distribution apparatus according to one embodiment of the present invention is used in a system which includes multiple regions including one or more radio systems. In each region, system information required for accessing one or more radio systems is distributed to a terminal apparatus in a common control signal. The distribution of this control signal may be not only distribution using wireless, but also distribution using wire line. The region corresponds to one mesh. The system information, more particularly, includes information on an operator which operates the radio system in the mesh, information on a frequency used in each radio system (a center frequency and bandwidth information), information on radio access technology (RAT), information on charging method, etc.

The distribution apparatus may include a unit which stores system information required for accessing a radio system in a region of an own apparatus, a unit which changes an amount of information distributed in accordance with times of a request signal from a terminal, a unit which determines, according to a frequency of request, the amount of information distributed according to times of request, and a unit which distributes common control information.

A distribution apparatus according to one embodiment of the present invention includes a unit which generates a common control signal for each region, a unit which receives a distribution request signal from a terminal apparatus which requests for distributing the common control signal, and a unit which transmits the common control signal according to a distribution rule in response to the distribution request signal, wherein system information includes multiple control information items, the distribution rule specifies which control information item is included at which time of transmission of the common control signal, and the distribution rule is arranged to be updated according to a statistical trend of a distribution request signal received. The distribution rule is updated according to the statistical trend of the distribution request signal received, so that a method of distribution is optimized according to a statistical communications status, which is preferable from a viewpoint of improving distribution efficiency of the common control information. Updating the distribution rule is preferable from a viewpoint of improving distribution efficiency, taking account of importance of a control information item.

In response to frequencies of requests for each of the multiple control information items, it may be determined as to what control information item is included in which time of transmission of the common control signal. A large request frequency is associated with a high utilization and importance of the control information item. Transmitting these at an early timing (at a stage of early times) is preferable from a viewpoint of seeking to improve information distribution efficiency.

A request frequency of each of the multiple control information items may be calculated as a frequency per region. This is preferable from a viewpoint of improving information distribution efficiency with a relatively small calculation amount.

A request frequency of each of the multiple control information items may be calculated as an average frequency in the whole of multiple regions. This is preferable from a viewpoint of improving information distribution efficiency in the whole of multiple regions (the whole system).

In response to priorities of each of the multiple control information items, it may be determined as to what control information item is included in which time of transmission of the common control signal. This is preferable from a viewpoint of taking a known priority into account to further set, in an appropriate manner, importance of control information item and achieve an optimization of a distribution rule.

A terminal apparatus according to one embodiment of the present invention determines a radio system to be connected based on system information distributed from a distribution apparatus and starts a synchronization process and a connection process according to the radio parameter. The terminal apparatus may include a unit which receives control information distributed from the distribution apparatus, a unit which recognizes system information from control information received, and a unit which requests lacking system information to the distribution apparatus.

A terminal apparatus according to one embodiment of the present invention includes a unit which transmits, to a distribution apparatus, a distribution request signal for requesting distribution of a common control signal, and a unit which receives the common control signal from the distribution apparatus, wherein the common control signal includes system information needed to access a communications system of each region, the system information includes multiple control information items, the common control signal is received after it is transmitted from the distribution apparatus according to a distribution rule, the distribution rule specifies which time of the common control signal is included in which type of transmission of the common control signal, and the distribution rule is updated according to a statistical trend of a distribution request signal received by the distribution apparatus.

A unit which obtains one or more control information items from a received common control signal may be included in a terminal apparatus.

If it is confirmed that there is not a full array of control information items required, the distribution request signal may be transmitted.

Until there is a full array of control information items required, transmission of a distribution request signal and reception of a common control signal may be repeated.

An embodiment of the present invention allows distributing common control information in line with a requesting trend from a terminal apparatus and giving required information more opportunities for transmission, making it possible to improve frequency utilization efficiency.

According to one embodiment of the present invention, the distribution apparatus is arranged to distribute mainly system information with a large number of requests from a terminal apparatus. The distribution apparatus receives a request signal from the terminal apparatus and checks the number of times of requests with the terminal apparatus. According to the times of transmissions of the request signal, a distribution rule of the system information is updated. For example, suppose that the system information includes basic system information (operator information and frequency information), radio access technology information, and charging information. When the terminal apparatus transmits a first request signal to the distribution apparatus, the distribution apparatus transmits to the terminal apparatus basic system information as a common control signal in response thereto. When the terminal apparatus transmits a second request signal to the distribution apparatus, the distribution apparatus transmits to the terminal apparatus radio access technology information as a common control signal in response thereto. When the terminal apparatus transmits a third request signal to the distribution apparatus, the distribution apparatus transmits to the terminal apparatus charging information as a common control signal in response thereto. In this way, an information item included in the common control information differs depending on the request time from the terminal apparatus.

According to one embodiment of the present invention, the times of transmission of a request signal by each terminal apparatus are counted over a certain period at the distribution apparatus, and a statistical trend of the request is investigated. According to this statistical trend, what control information item is included in which time of transmission of the common control signal is updated. Frequency of updating may be any appropriate period (for example, it may be once per day, once per week, or it may differ between day and evening). Type and information amount of the distribution information are changed as needed according to the request times. For example, if a trend that the terminal apparatus transmits a request signal twice is particularly strong in the above example, the distribution rule may be updated such that not only the basic system information but also the radio access technology information are included in the common control signal to be transmitted the first time, and charging information is included in the common control signal transmitted the second time. In this way, this leads to a large number of terminal apparatuses requiring only once each of transmission of a request signal and reception of a common control signal in that region, making it possible to achieve an improvement in distribution efficiency.

For convenience of explanations, the present invention is explained by breaking it down into a number of embodiments or items. However, such a breakdown is not essential to the present invention, so that matters recited in separate embodiments or items may be combined for use as needed. While specific numerical value examples are used to facilitate understanding of the present invention, such numerical values are merely examples, so that any appropriate value may be used unless specified otherwise.

The embodiments of the present invention are described from the following viewpoints:
A. Distribution apparatus
B. Terminal apparatus
C. Distribution of common control signal
D. Method 1 of determining distribution rule
E. Method 2 of determining distribution rule Embodiment 1

Below, an embodiment of the present invention is described with reference to the drawings. The drawings emphasize those elements particularly relevant to the embodiment, so that the other elements are omitted for brevity of illustration.

A. Distribution Apparatus

Figure 1:
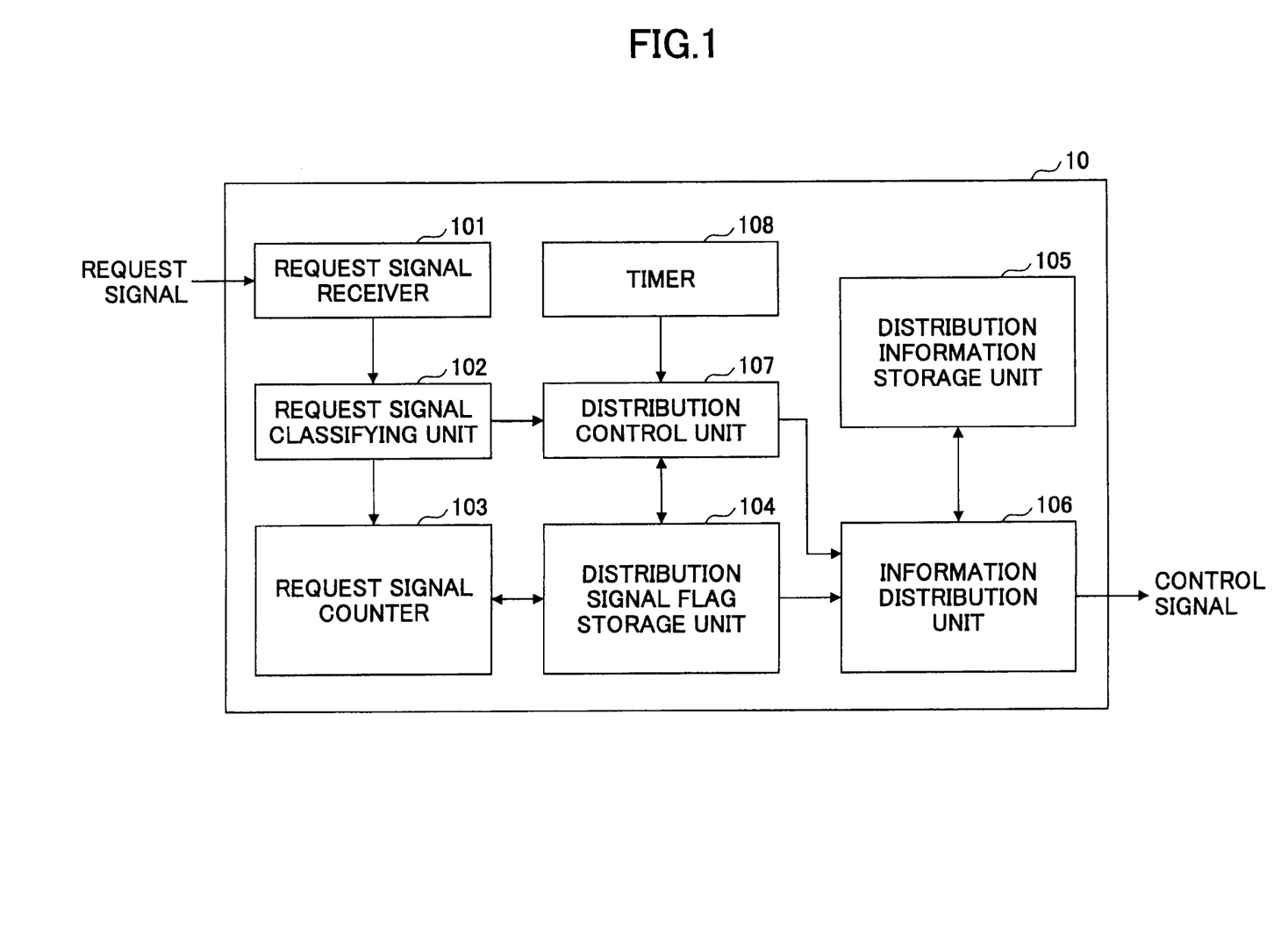
FIG. 1 is a configuration diagram of a distribution apparatus according to one embodiment of the present invention.

FIG. 1 shows a distribution apparatus for use in the present embodiment. The distribution apparatus distributes a common control signal to multiple regions (meshes). In each region, one or more communications systems can be used. Thus, the distribution apparatus is generally associated with one or more base stations of one or more communications systems. The distribution apparatus may be built as an apparatus which is independent from any base station, or any base station may also include a function of the distribution apparatus. FIG. 1 shows a request signal receiver 101, a request signal classifying unit 102, a request signal counter 103, a distribution signal flag storage unit 104, a distribution information storage unit 105, an information distribution unit 106, a distribution control unit 107, and a timer 108. Three elements, the request signal receiver 101, the request signal classifying unit 102, and the request signal counter 103, make up a main portion of a unit which recognizes a request signal. The distribution signal flag storage unit 104, the distribution control unit 107, and the timer 108 make up a main portion of a unit which determines a distribution order. The distribution information storage unit 105 and the information distribution unit 106 make up a main portion of a unit which distributes information.

The request signal receiver 101 receives the request signal from a terminal apparatus.

The request signal classifying unit 102 checks which time of request the request signal received from the terminal apparatus is and classifies the request signal. When a common control signal is returned in response to the request signal, information items (system information type, control information item, etc.) differ depending on the time thereof. Details of operations in this case are discussed later.

The request signal counter 103 provides a classification result by the request signal classifying unit 102 and statistical information on the system information type requested.

The distribution signal flag storage unit 104 stores the system information type specified according to the number of times of requests. For example, a system information type within system information is to be specified by A, B, C, D, E, and F. It is shown that a flag is set for A to indicate that a system information item A is distributed. The distribution signal flag storage unit 104 stores such a flag.

The distribution information storage unit 105 stores information which may be distributed. For the above example, specific contents of information types A through F are stored at the distribution information storage unit 105.

The information distribution unit 106 includes, in a common control signal, a system information type corresponding to each flag based on a series of flags retrieved from the distribution signal flag storage unit 104.

The distribution control unit 107 controls an operation of each element within the distribution apparatus. The distribution apparatus transmits a common control signal to the terminal apparatus according to a distribution rule. The distribution rule is periodically/aperiodically updated. The distribution control unit 107 controls (1) how the distribution rule is updated; and (2) an operation of distributing the common control signal under the distribution rule.

The timer 108 detects progress over a certain period and reports the detected result to the distribution control unit 107. The certain period may be associated with update frequency of the distribution rule. The certain period may be any appropriate period, and may be specified by an hour, a minute, a second, a day, a week, a month, etc.

B. Terminal Apparatus

Figure 2:
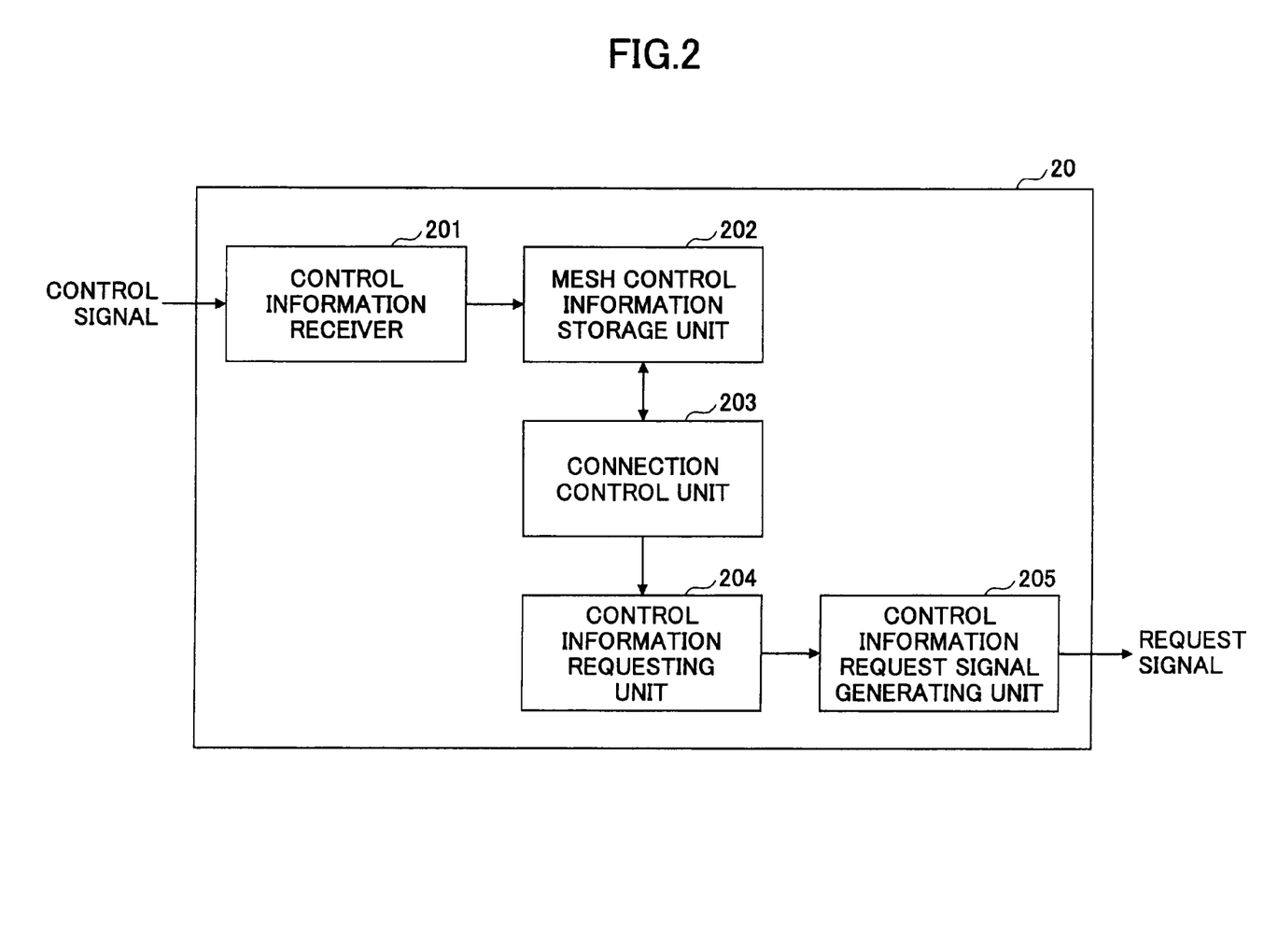
FIG. 2 is a configuration diagram of a terminal apparatus according to one embodiment of the present invention.

FIG. 2 shows a terminal apparatus in the present embodiment. FIG. 2 shows a control information receiver 201, a mesh control information storage unit 202, a connection control unit 203, a control information requesting unit 204, and a control information request signal generating unit 205. The control information receiver 201 and the mesh control information storage unit 202 make up a major portion of a receive processing unit. The control information requesting unit 204 and the control information request signal generating unit 205 make up a major portion of a unit which generates a request signal.

The control information receiver 201 receives a common control signal distributed from a distribution apparatus.

The mesh control information storage unit 202 retrieves, from the received common control signal, system information and stores the same. The common control signal which is distributed for each region (for each mesh) may be stored for each mesh.

The connection control unit 203 controls a connection to a radio system. The terminal apparatus uses the above-described system information to access the radio system, and obtains from the radio system connection control information required for establishing a connection with the radio system.

The control information requesting unit 204 determines whether there is a full array of system information sets required for accessing the radio system. If not, a below-described request signal is generated. A determination as to whether there is a full array of system information sets may be conducted by checking whether a flag corresponding to each of system information types is set, for example.

The control information request signal generating unit 205 transmits a request signal if all or a part of system information sets required is lacking.

C. Distribution of Common Control Signal

Figure 3:
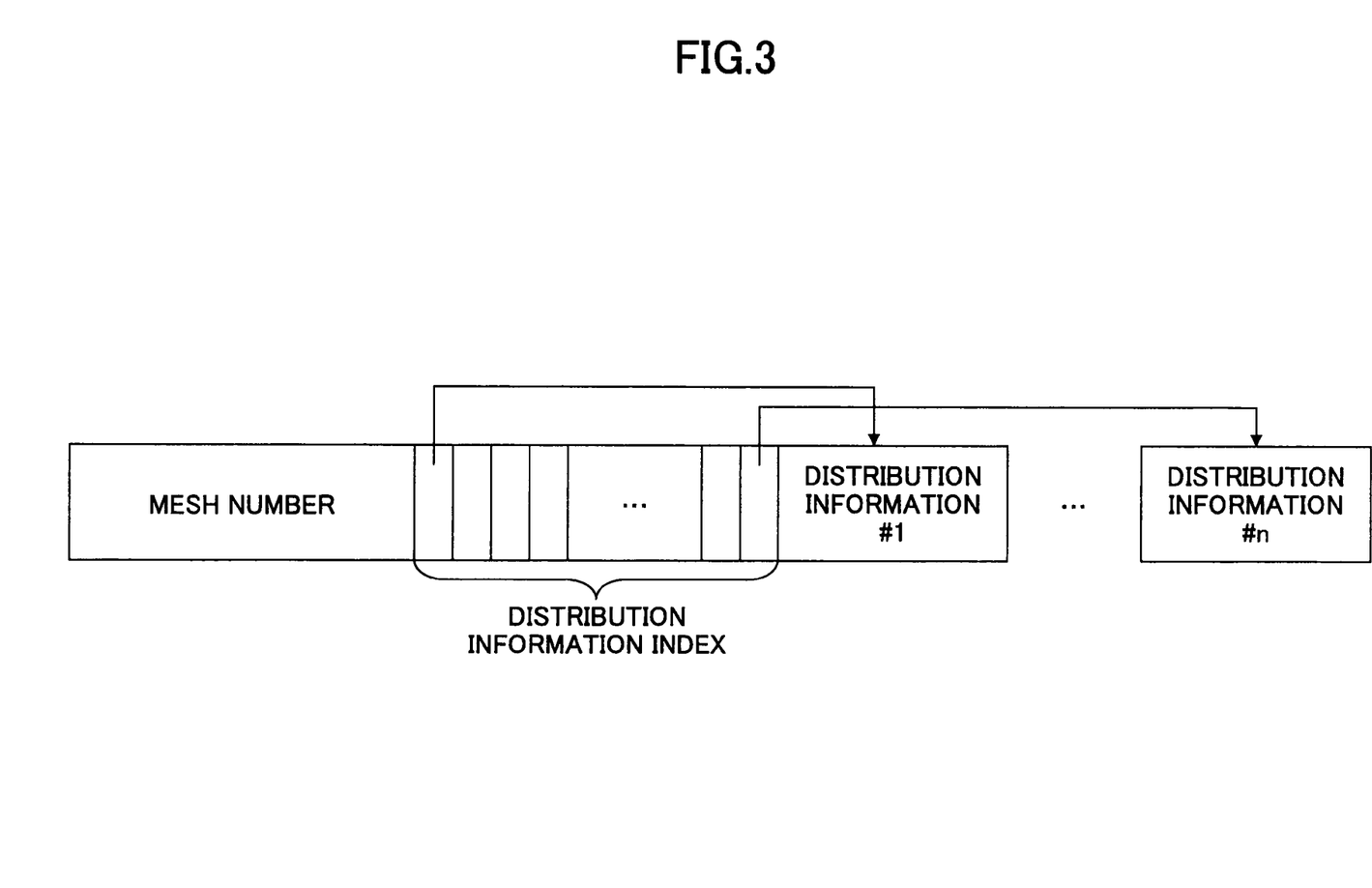
FIG. 3 is a signal configuration diagram of a common control signal according to one embodiment of the present invention.

FIG. 3 shows a common control signal for use in the present embodiment. It is the same as the related-art cognitive pilot channel (CPC) in that the common control signal is distributed for each region (mesh), that one or more radio systems can be used in each region, and in that the common control signal includes system information required for accessing a radio system operated in each region. However, it is significantly different in that which system information type is included in which time of transmission of the common control signal is updated according to a statistical trend of the request signal.

The common control signal is distributed from a distribution apparatus as follows. When a request signal transmitted from a terminal apparatus is received at the request signal receiver 101, it is reported to the request signal classifying unit 102. The request signal classifying unit 102 checks the request time, and terminal information and mesh information specified in the request signal.

Figure 4:
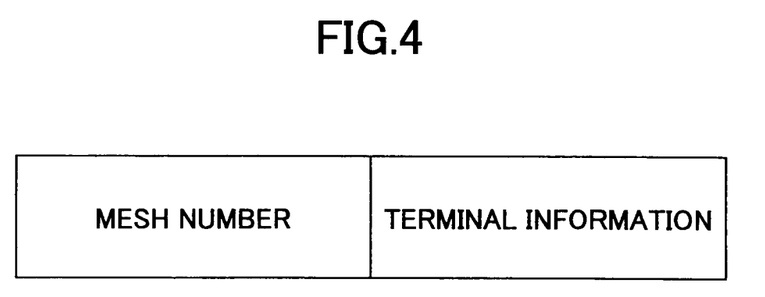
FIG. 4 is a signal configuration diagram of a request signal according to one embodiment of the present invention.

FIG. 4 shows an exemplary request signal. The request signal includes terminal information for identifying a terminal, and mesh information for identifying a mesh or a region to which a terminal apparatus belongs. In the exemplary illustration, the mesh information is denoted with a number, but it may be denoted, not only with the number, but with any appropriate identifying information which identifies a region. The request signal classifying unit 102 recognizes the maximum times of making requests based on a mesh number and terminal information in the request signal. The maximum times of requests represent how many times a request signal is transmitted by a terminal apparatus so that a full array of system information required is included. Which system information type is included in which time of transmission of the common control signal is determined according to a certain distribution rule. For convenience of explanations, suppose that the system information includes system information types A-F, and the distribution rule is determined such that the system information types A and B are included in a common control signal transmitted the first time from the distribution apparatus, the system information types C and D are included in the common control signal transmitted the second time from the distribution apparatus, and the system information types E and F are included in the common control signal transmitted the third time from the distribution apparatus. In this case, when all system information sets required are obtained by receiving the common control signal only once, the maximum request times for the terminal apparatus becomes 1. When all system information sets required are obtained by receiving the common control signal twice, the maximum request times for the terminal apparatus becomes 2. The request signal counter 103 counts such times for each terminal apparatus. In the present embodiment, such a distribution rule is updated periodically or aperiodically. How the update is made is described below.

The mesh number, the terminal information, and the request times are reported to the distribution control unit 107 in FIG. 1. Under the control of the distribution control unit 107, (a flag which indicates) the system information type to be distributed is reported from the distribution signal flag storage unit 104 to the information distribution unit 106. Based on (the flag of) the system information type and the mesh number obtained from the distribution signal flag storage unit 104, the information distribution unit 106 reads the required system information type from the distribution information storage unit 105, generates a common control signal to be transmitted next, and transmit the same.

D. Method 1 of Determining Distribution Rule

Figure 5:
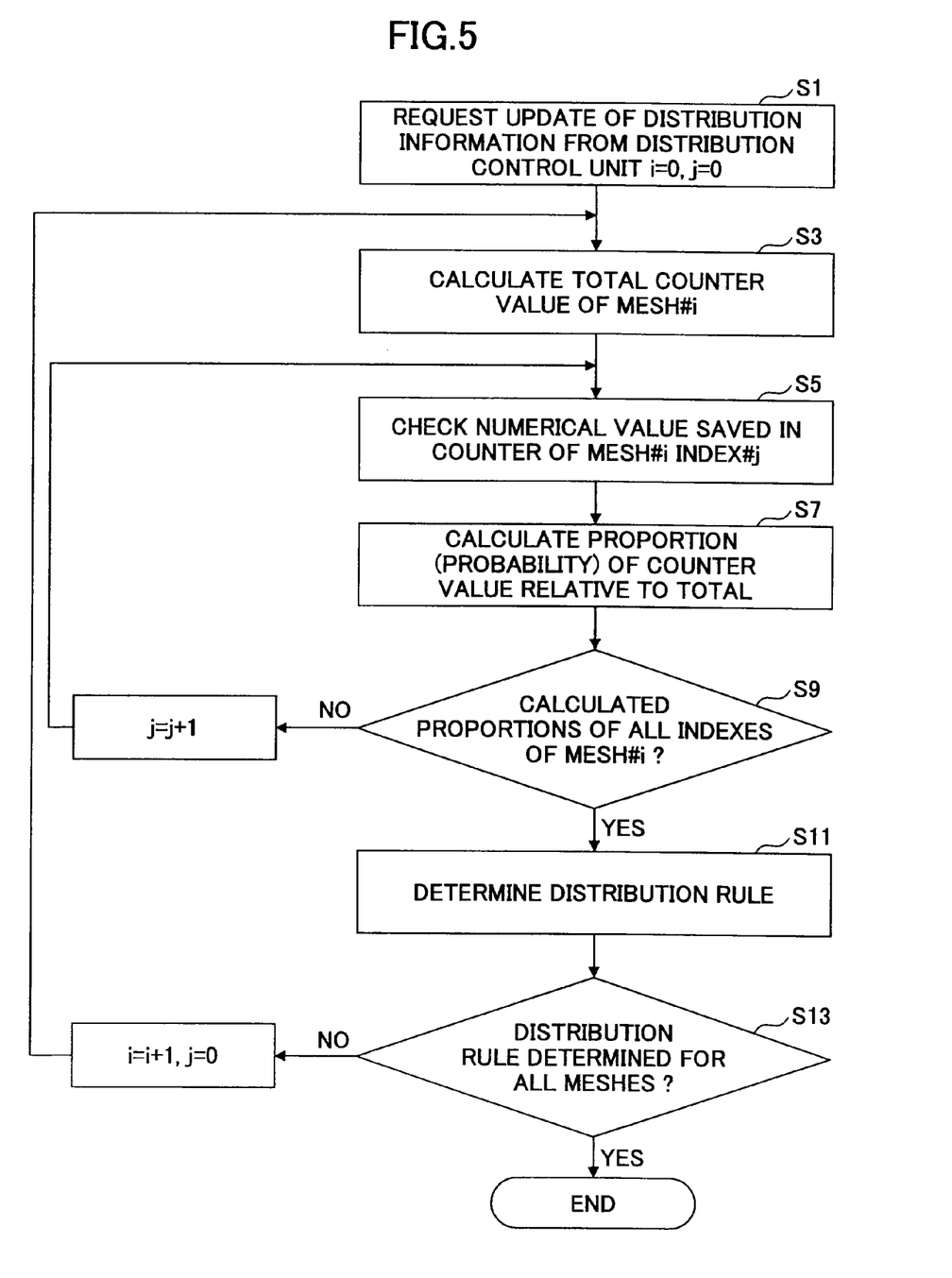
FIG. 5 is a flowchart illustrating a first part of an exemplary method of determining a distribution rule according to one embodiment of the present invention.

FIG. 5 is a flowchart which shows an example of a method of determining a distribution rule. For convenience of explanations, six system information types are to be specified as A-F.

The flow starts from step S1, where a parameter i which shows a mesh number and a parameter (index) j which refers to system information types A-F are respectively set to an initial value. The distribution rule is periodically and/or aperiodically updated. Frequency of updating may be any appropriate number. For example, when the distribution rule is updated each day, a time elapse of one day is detected with a timer of a distribution apparatus, so that the present flow begins. As described above, the request signal classifying unit 102 and the request signal counter 103 provide statistical information on a received request signal after the last update.

In step S3, a total number of receptions of a request signal from all terminal apparatuses is calculated for a mesh number i. The total number received corresponds to a total number, which is a result of adding, over all the terminal apparatuses, the maximum request times indicated by a request signal counter of each terminal apparatus.

In step S5, times of requests for each of system information types A to F are checked for the mesh number i.

In step S7, the total value calculated in step S3 and the times calculated in step S5 are used to calculate the request frequency of each of the system information types A to F for the mesh number i. The request frequency may also been referred to as a proportion or a probability.

In step S9, whether the request frequency has been calculated for all of the system information items A to F is checked; and, if no, the flow returns to step S5, and if yes, the flow proceeds to step S11.

In step S11, which system information type A-F is included in which time of transmission of the common control signal is determined in line with the above-described request frequency. As an example, suppose that the proportion of users (terminal apparatuses) with the maximum request times of one is $1/3$, the proportion of users with the maximum request times of two is $1/2$, and the proportion of users with the maximum request times of three is $1/6$. When such a statistical trend is established, a method of distributing the system information types A to F is determined according to the above-described proportions. First, the probability of information which requires one time only is $1/3$, so that, of all 6 levels, the system information types A and B, which are in the upper third with the highest priority are included in first common control information. The probability of information which requires two times only is $1/2$, so that the system information types C, D, and E, which are in the upper half with the second highest priority are included in second common control information. The probability of information which requires three times is $1/6$, so that a system information type F, which is of the next highest priority is included in third common control information.

In step S13, whether a distribution rule is determined for all meshes is checked, and, if no, the flow returns to step S3, wherein a similar procedure is repeated for the next mesh. If a distribution rule is determined for all meshes, the flow ends.

According to the present method, a distribution rule can be optimized for each mesh.

E. Method 2 of Determining Distribution Rule

Figure 6:
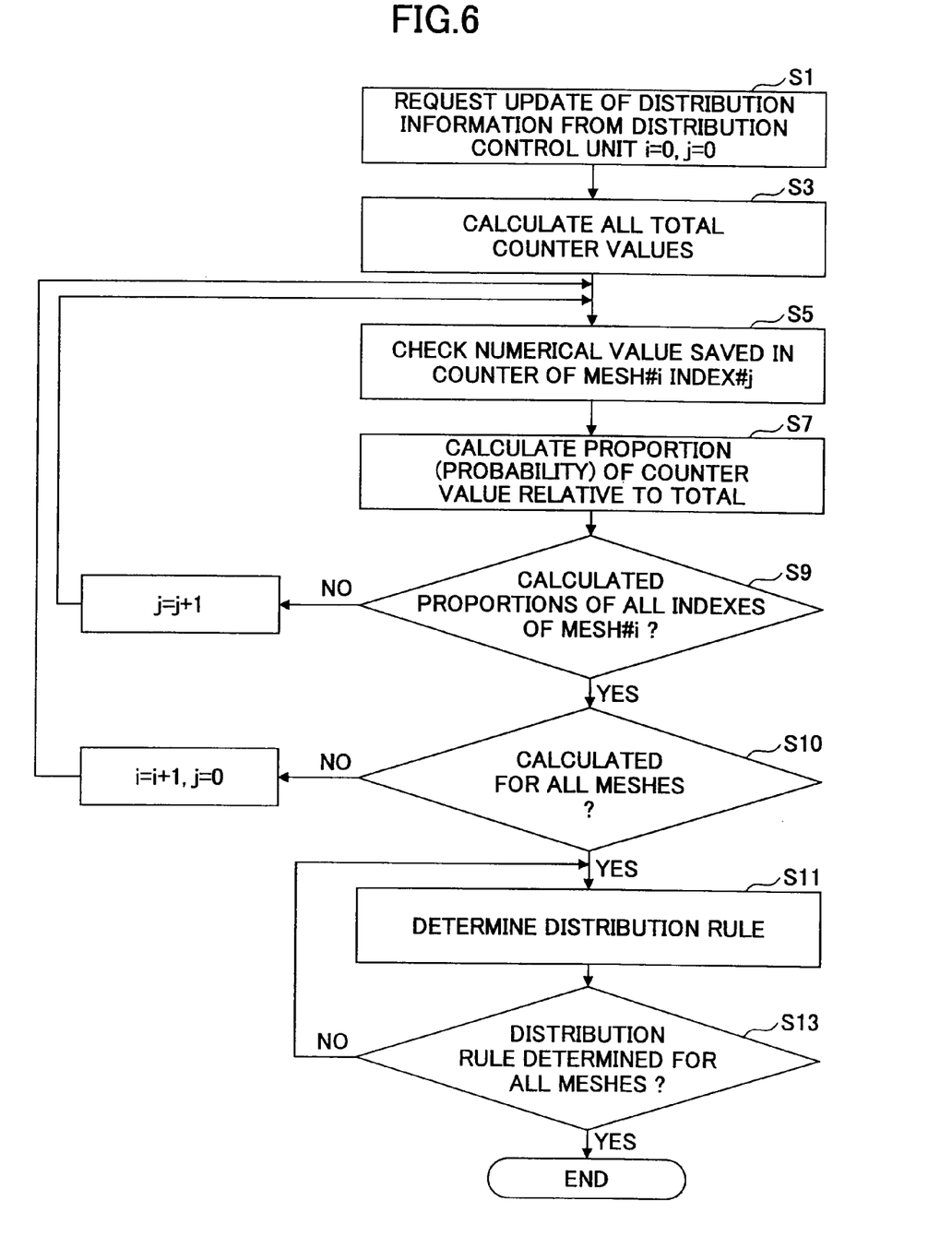
FIG. 6 is a flowchart illustrating a second part of the exemplary method of determining the distribution rule according to the one embodiment of the present invention.

As in FIG. 5, FIG. 6 also shows an example of the method of determining the distribution rule. In the flow in FIG. 5, the distribution rule is optimized for each mesh; in the flow in FIG. 6, the distribution rule is optimized, taking into account all the meshes. More specifically, in step S3, a total number of receptions of a request signal from all terminal apparatuses is calculated. The total number of receptions is a total number for all meshes, not just for an individual mesh. In the flow of FIG. 6, step S10 is added between step S9 and step S11, so that it is checked whether a process is completed for all of the meshes. The other steps descriptions are omitted as they are similar to what was described with respect to FIG. 5. In the present flow, a request frequency of a system information type represents an average frequency for all the meshes as opposed to a frequency in a particular mesh. Thus, the present method makes it possible to optimize a distribution rule over all the regions (meshes) covered by the distribution apparatus. The method shown in FIG. 6 is preferable to the method shown in FIG. 5 in being able to further optimize the distribution rule. The method shown in FIG. 5 is preferable in that it only needs an operation burden smaller than the method shown in FIG. 6.

Figure 7:
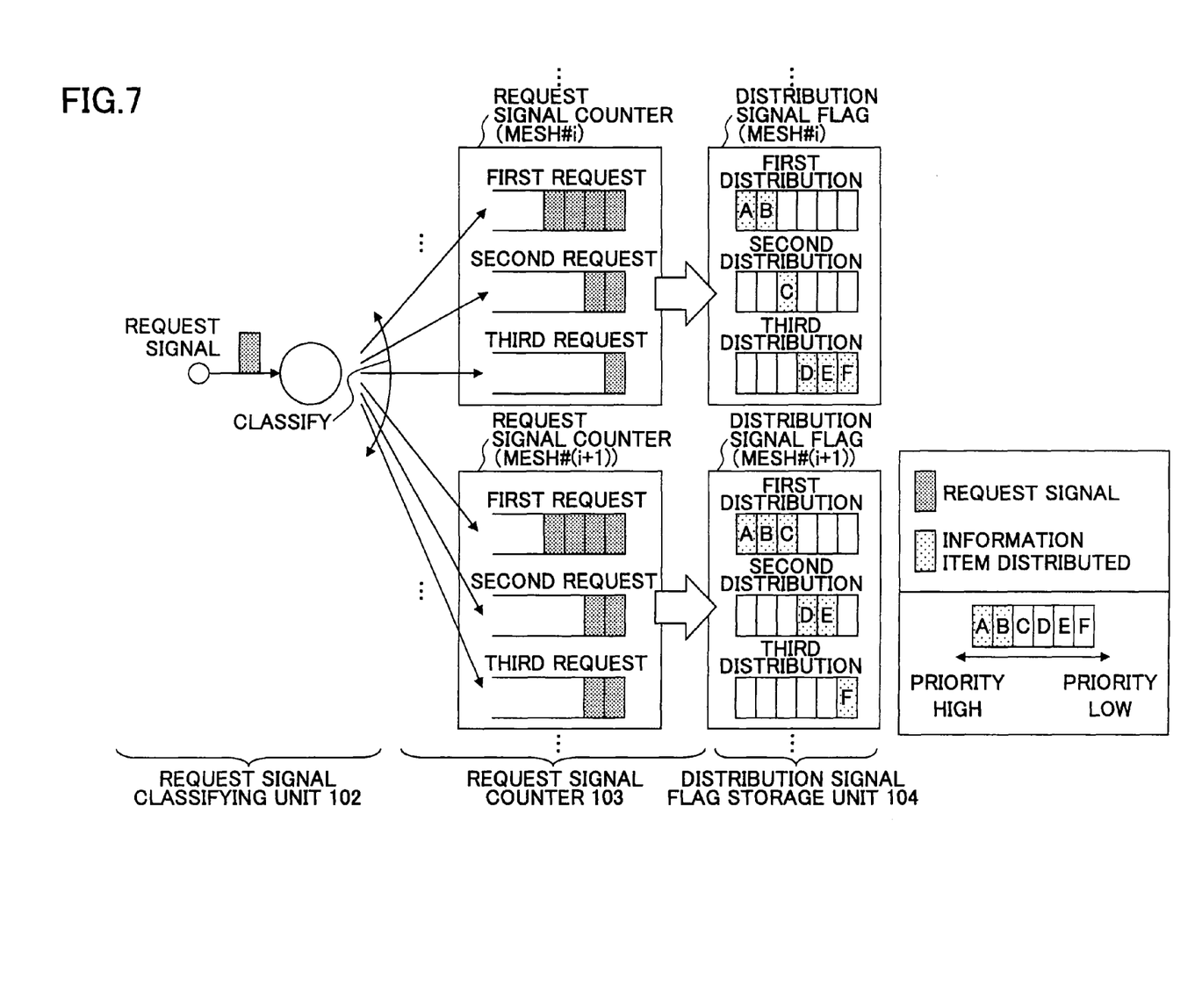
FIG. 7 is an overview diagram of a major operation according to one embodiment of the present invention.

FIG. 7 schematically shows how a common control signal is transmitted for each region (mesh) according to the distribution rule. For the mesh number i, the system information types A and B are included in the first common control signal, the system information type C is included in the second common control signal, and the system information types D, E, and F are included in the third common control signal. For the mesh number i+1, the system information types A, B, and C are included in the first common control signal, the system information types D and E are included in the second common control signal, and the system information type F is included in the third common control signal. In this way, a distribution rule in each region may be updated as needed according to the request frequency of system information type to significantly improve the distribution efficiency of the common control signal.

As described above, while the present invention is described with reference to specific embodiments, the respective embodiments are merely exemplary, so that a skilled person will understand variations, modifications, alternatives, replacements, etc. While specific numerical value examples are used to facilitate understanding of the present invention, such numerical values are merely examples, so that any appropriate value may be used unless specified otherwise. The breakdown of embodiments or items is not essential to the present invention, so that matters described in two or more embodiments or items may be combined for use as needed. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2008-215929 filed on Aug. 25, 2008, the entire contents of which are hereby incorporated by reference.

DESCRIPTION OF NOTATIONS 10 distribution apparatus; 101 request signal receiver; 102 request signal classifying unit; 103 request signal counter; 104 distribution signal flag storage unit; 105 distribution information storage unit; 106 information distribution unit; 107 distribution control unit; 108 timer; 20 terminal apparatus; 201 control information receiver; 202 mesh control information storage unit; 203 connection control unit; 204 control information requesting unit; 205 control information request signal generating unit

The invention claimed is:

1. A distribution apparatus which distributes a common control signal to one or multiple regions, in each of which regions exists one or more communications systems which can be used, the common control signal including system information required for accessing the one or more communications systems of the regions, the distribution apparatus comprising:
   a unit which generates the common control signal for each of the regions;
   a unit which receives a distribution request signal from a terminal apparatus which requests for distribution of the common control signal;
   a unit which transmits the common control signal according to a distribution rule in response to the distribution request signal, wherein
   the system information includes multiple control information items, the distribution rule specifies which of control information items is included in which time of transmission of the common control signal, and the distribution rule is updated according to a statistical trend of distribution request signals received.

2. The distribution apparatus as claimed in claim 1, wherein, in response to a frequency of request of each of the multiple control information items, which of the control information items is included in which time of the transmission of the common control signal is determined.

3. The distribution apparatus as claimed in claim 2, wherein the frequency of the request of each of the multiple control information items is calculated as a frequency per region.

4. The distribution apparatus as claimed in claim 2, wherein the frequency of the request of each of the multiple control information items is calculated as an average frequency in all the regions.

5. The distribution apparatus as claimed in claim 1, wherein, in response to a priority of each of the multiple control information items, it is determined as to which of the control information items is included in which time of the transmission of the common control signal.

6. A terminal apparatus used in one or multiple regions, in each of which regions exists one or more communications systems which can be used, the terminal apparatus comprising:
   a unit which transmits, to a distribution apparatus, a distribution request signal for requesting a distribution of a common control signal; and
   a unit which receives the common control signal from the distribution apparatus, wherein the common control signal includes system information required for accessing the one or more communications systems of the regions, the system information includes multiple control information items,
   the common control signal is received after being transmitted from the distribution apparatus according to a distribution rule,
   the distribution rule specifies which of control information items is included in which time of transmission of the common control signal, and the distribution rule is updated according to a statistical trend of distribution request signals received at the distribution apparatus.

7. The terminal apparatus as claimed in claim 6, further comprising:
   a unit which obtains one or more of the control information items from the received common control signal.

8. The terminal apparatus as claimed in claim 7, wherein, when it is determined that there is not a full array of control information items required, the distribution request signal is transmitted.

9. The terminal apparatus as claimed in claim 8, wherein, until there is the full array of the control information items required, transmission of the distribution request signal and reception of the common control signal are repeated.

10. A distribution system which distributes a common control signal to one or multiple regions, in each of which regions exists one or more communications systems which can be used, the common control signal including system information required for accessing the one or more communications systems of the regions, the distribution system comprising:
    a terminal apparatus which generates and transmits a distribution request signal for requesting distribution of the common control signal; and
    a distribution apparatus which generates the common control signal of each of the regions, receives the distribution request signal from the terminal apparatus, and transmits the common control signal according to a distribution rule,
    wherein the system information includes multiple control information items, the distribution rule specifies which of control information items is included in which time of transmission of the common control signal, and the distribution rule is updated according to a statistical trend of distribution request signals received at the distribution apparatus.

11. A method for use in a distribution system which distributes a common control signal to one or multiple regions, in each of which regions exists one or more communications systems which can be used, the common control signal including system information required for accessing the one or more communications systems of the regions, the method including the steps of:
    generating and transmitting, by a terminal apparatus, a distribution request signal for requesting distribution of the common control signal; and
    by a distribution apparatus, generating the common control signal of each of the regions, receiving the distribution request signal from the terminal apparatus, and transmitting the common control signal according to a distribution rule,
    wherein the system information includes multiple control information items, the distribution rule specifies which of control information items is included in which time of transmission of the common control signal, and the distribution rule is updated according to a statistical trend of distribution request signals received at the distribution apparatus.

* * * * *